(12) United States Patent  
Ramsay et al.

(10) Patent No.: US 10,445,994 B2  
(45) Date of Patent: *Oct. 15, 2019

(54) SYSTEMS AND METHODS FOR MINIMAL HAPTIC IMPLEMENTATION

(71) Applicant: Immersion Corporation, San Jose, CA (US)

(72) Inventors: Erin B. Ramsay, Montreal (CA); Henrique D. da Costa, Montreal (CA); Neil Olien, Montreal (CA); Robert A. Lacroix, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,551

(22) Filed: Mar. 28, 2018

(65) Prior Publication Data

US 2018/0350204 A1 Dec. 6, 2018

Related U.S. Application Data

(63) Continuation of application No. 15/174,942, filed on Jun. 6, 2016, now Pat. No. 9,959,714, which is a continuation of application No. 12/615,831, filed on Nov. 10, 2009, now Pat. No. 9,358,689.

(51) Int. Cl.
*G08B 6/00* (2006.01)
*B25J 9/16* (2006.01)

(52) U.S. Cl.
CPC .............. *G08B 6/00* (2013.01); *B25J 9/1689* (2013.01); *G05B 2219/40619* (2013.01)

(58) Field of Classification Search
CPC ................................ G08B 6/00; B25J 9/1689
See application file for complete search history.

(56) References Cited

U.S. PATENT DOCUMENTS

| | | | |
|---|---|---|---|
| 6,001,014 A | 12/1999 | Hiroki et al. | |
| 7,307,619 B2 | 12/2007 | Cunningham et al. | |
| 8,117,364 B2 | 2/2012 | Nielsen et al. | |
| 9,358,689 B2 | 6/2016 | Ramsay et al. | |
| 2006/0190823 A1* | 8/2006 | Cunningham | G06F 3/016 715/701 |
| 2009/0096632 A1 | 4/2009 | Ullrich et al. | |
| 2009/0238544 A1 | 9/2009 | Orsini | |
| 2010/0177050 A1 | 7/2010 | Heubel et al. | |
| 2011/0248817 A1 | 10/2011 | Houston et al. | |
| 2016/0284173 A1 | 9/2016 | Ramsay et al. | |

OTHER PUBLICATIONS

U.S. Appl. No. 15/174,942, "Non-Final Office Action", dated Sep. 6, 2017, 8 pages.

* cited by examiner

*Primary Examiner* — Nabil H Syed
(74) *Attorney, Agent, or Firm* — Kilpatrick Townsend & Stockton LLP

(57) ABSTRACT

Systems and methods for minimal haptic implementation are disclosed. For example, one disclosed system includes: an actuator; and a control-circuit in communication with the actuator, the control circuit configured to: receive a haptic signal including a first bit indicating a power state; and transmit a power signal based on the haptic signal, the power signal configured to cause the actuator to operate at an actuation state at a fixed power.

15 Claims, 6 Drawing Sheets

SYSTEMS AND METHODS FOR MINIMAL HAPTIC IMPLEMENTATION

CROSS-REFERENCE TO RELATED APPLICATIONS

This application is a continuation of U.S. patent application Ser. No. 15/174,942, entitled "Systems and Methods for Minimal Haptic Implementation," filed Jun. 6, 2016, which is a continuation of U.S. patent application Ser. No. 12/615,831, entitled "Systems and Methods for Minimal Haptic Implementation," filed Nov. 10, 2009, both of which are hereby incorporated by reference.

FIELD OF THE INVENTION

The present invention generally relates to haptic feedback systems and more specifically to systems that implement a minimal approach for haptic feedback.

BACKGROUND

The use of haptic feedback in many different types of devices is becoming more common. Many devices implement a complex and therefore expensive form of haptic feedback. Less expensive devices could benefit from haptic feedback; thus, there is a need for systems and methods for minimal haptic implementation.

SUMMARY

Embodiments of the present invention provide systems and methods for minimal haptic implementation. For example, in one embodiment a system for minimal haptic implementation comprises: an actuator; and a control-circuit in communication with the actuator, the control circuit configured to: receive a 2-bit signal comprising a first bit indicating a power state and a second bit indicating an actuation state; and transmit a power signal based on the two bit signal, the power signal configured to cause the actuator to operate at the actuation state at a fixed power.

This illustrative embodiment is mentioned not to limit or define the invention, but to provide an example to aid understanding thereof. Illustrative embodiments are discussed in the Detailed Description along with a further description of the invention. Advantages offered by various embodiments of this invention may be further understood by examining this Specification.

BRIEF DESCRIPTION OF THE DRAWINGS

The features, aspects, and advantages of the present invention are better understood when the following Detailed Description is read in conjunction with the accompanying figures, wherein.

DETAILED DESCRIPTION

Figure 1:
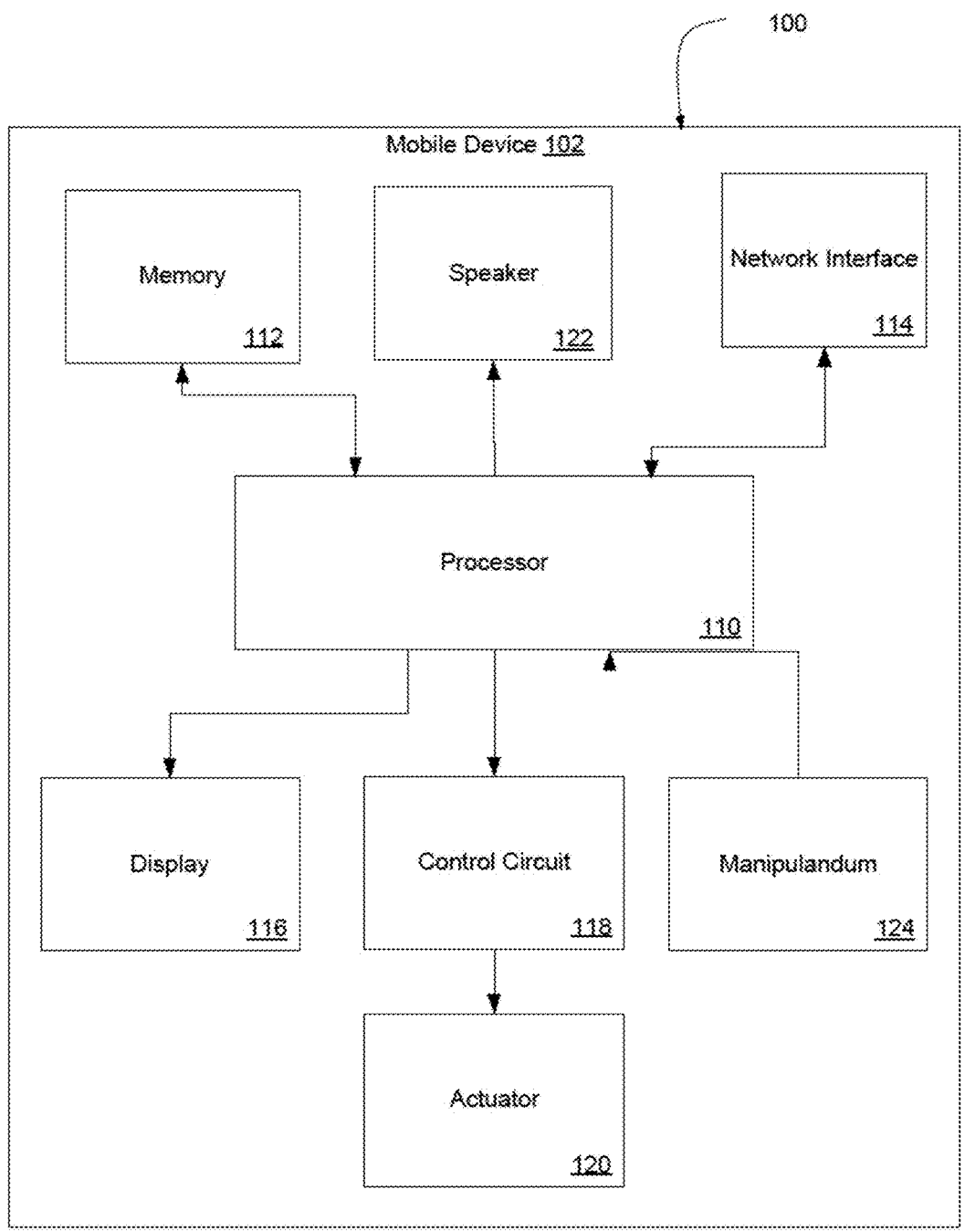
FIG. 1 is a block diagram of a system for minimal haptic implementation according to one embodiment of the present invention.

Embodiments of the present invention provide systems and methods for minimal haptic implementation.

Illustrative Embodiment of Systems and Methods for Minimal Haptic Implementation One illustrative embodiment of the present invention comprises a mobile device such as a mobile phone. The mobile device comprises a housing, which contains a touch-screen display. The mobile device also comprises a processor and memory. The processor is in communication with both the memory and the touch-screen display. To provide haptic feedback, the illustrative mobile device comprises an actuator, such as an ERM actuator, a piezo-electric actuator, or other type of actuator, which is in communication with a control circuit. The control circuit is configured to receive a haptic signal from the processor, and in response, output a power signal to the actuator. In response to the power signal, the actuator outputs a haptic effect. In the illustrative embodiment, as the user interacts with the mobile device, the processor generates the appropriate haptic signal and transmits the signal to a control circuit. The control circuit then transmits a power signal to the actuator, which produces the haptic effect.

In the illustrative embodiment, the processor generates a haptic signal comprising 2-bits. The first bit comprises a power state for the actuator. For example, the actuator's power state may be either power on or power off. The second bit comprises an actuation state for the actuator. For example, in the illustrative embodiment, the second bit may indicate that a rotary actuator should rotate in the clockwise direction. The processor then transmits the 2-bit signal to a control circuit.

In the illustrative embodiment, the control circuit comprises an H-bridge or a relay. After receiving the 2-bit signal, the control circuit outputs a power signal configured to cause the actuator to operate in the indicated actuation state at a fixed power. In one such embodiment, the fixed power comprises substantially the full power at which the actuator is capable of operating. Once the actuator receives the power signal, the actuator operates at the fixed power in the indicated actuation state. The actuator continues to operate until the control circuit stops transmitting the power signal. In the illustrative embodiment, the actuator comprises a rotary actuator. Thus, if the power signal has a positive polarity, the actuator may rotate clockwise, and if the power signal has a negative polarity, the actuator may rotate counterclockwise.

When the actuator is in operation, it generates a haptic effect. In the illustrative embodiment, this haptic effect comprises a click. The illustrative mobile device may output the click after a user presses a button or interacts with a touch-screen or touch-surface on the mobile device. Thus, the click may act as a confirmation that the processor received a signal indicating that the user pressed a button or initiated some action with the device. In the illustrative embodiment, this click alerts the user that there is no need to continue pressing the same button, touch-screen, or touch-surface.

This illustrative example is given to introduce the reader to the general subject matter discussed herein. The invention is not limited to this example. The following sections describe various additional embodiments and examples of methods and systems for minimal haptic implementation.

Illustrative Systems for Minimal Haptic Implementation

Referring now to the drawings in which like numerals indicate like elements throughout the several Figures, FIG. 1 is a block diagram of a system for minimal haptic implementation according to one embodiment of the present invention. As shown in FIG. 1, the system 100 comprises a mobile device 102, such as a mobile phone, portable digital assistant (PDA), portable media player, or portable gaming device. The mobile device 102 comprises a processor 110. The processor 110 includes or is in communication with one or more computer-readable media, such as memory 112, which may comprise random access memory (RAM). Processor 110 is in communication with a network interface 114, a display 116, a control circuit 118, an actuator 120, a speaker 122, and a manipulandum 124. Processor 110 is configured to generate a graphical user interface. Mobile device 102 displays the graphical user interface to the user via display 116.

Embodiments of the present invention can be implemented in combination with, or may comprise combinations of, digital electronic circuitry, computer hardware, firmware, and software. The mobile device 102, shown in FIG. 1, comprises a processor 110, which receives input signals and generates signals for communication, display, and providing haptic feedback. The processor 110 also includes or is in communication with one or more computer-readable media, such as memory 112, which may comprise random access memory (RAM).

Processor 110 is configured to execute computer-executable program instructions stored in memory 112. For example, processor 110 may execute one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. Processor 110 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 112 comprises a computer-readable medium that stores instructions, which when executed by processor 110, cause processor 110 to perform various steps, such as those described herein. Embodiments of computer-readable media may comprise, but are not limited to, electronic, optical, magnetic, or other storage or transmission devices capable of providing processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. In addition, various other devices may include computer-readable media such as a router, private or public network, or other transmission devices. The processor 110 and the processing described may be in one or more structures, and may be dispersed throughout one or more structures.

Referring still to FIG. 1, processor 110 is in communication with a network interface 114. Network interface 114 may comprise one or more methods of mobile communication, such as infrared, radio, Wi-Fi, or cellular network communication. In other variations, network interface 114 comprises a wired network interface, such as Ethernet. The mobile device 102 is configured to exchange data with other devices (not shown in FIG. 1) over networks such as a cellular network and/or the Internet. In various embodiments, the data exchanged between devices may comprise voice messages, text messages, data messages, or other forms of messages.

In the embodiment shown in FIG. 1, processor 110 is also in communication with a display 116. Processor 110 is configured to generate a signal associated with a graphical representation of a user interface. Processor 110 then transmits this signal to display 116, which is configured to display output based at least in part on the signal. In some embodiments, display 116 may comprise a liquid crystal display (LCD).

Mobile device 102 further comprises a manipulandum 124. Manipulandum 124 is configured to detect a user interaction and transmit signals corresponding to that user interaction to processor 110. Processor 110 then uses the received signals to modify the graphical user interface on display 116. In some embodiments, manipulandum 124 may comprise a track ball, buttons, keys, a scroll wheel, and/or a joystick. In other embodiments, manipulandum 124 may comprise a touch-screen positioned overtop of display 116. In such an embodiment, display 116 may sit underneath the touch-screen. In other embodiments, the display 116 and the touch-screen may comprise a single, integrated component such as a touch-screen LCD. In other embodiments, manipulandum 124 may be a touch-sensitive surface that is positioned anywhere on the mobile device 102. In one embodiment, manipulandum 114 may comprise a touch-screen, and the graphical user interface may comprise a virtual keyboard. In such an embodiment, when the user interacts with a section of the touch-screen that overlays one of the keys of the keyboard, the touch-screen sends a signal to processor 110 corresponding to the user interaction. Based on this signal, processor 110 will determine that the user has pressed one of the keys on the virtual keyboard. Such an embodiment may further allow the user to interact with other icons and virtual objects on the display. For example, in some embodiments the user may flick a touch-screen to move a virtual ball, or turn a virtual knob on a touch-screen. In other embodiments, a different type of manipulandum, such as a scroll wheel, roller ball, or button may facilitate similar interaction between the user and the graphical user interface.

In some embodiments, processor 110 may modify the graphical user interface on display 116 based on user interaction detected by manipulandum 124. Thus, a user may interact with virtual objects on display 116 via manipulandum 124. For example, manipulandum 124 may comprise a touch-screen. In such an embodiment, display 116 may comprise a virtual keyboard. The user may interact with the keys of the virtual keyboard via the touch-screen. In response, the touch-screen transmits signals corresponding to the interaction to processor 110. Based on these signals, processor 110 may determine that the user pressed certain keys on the virtual keyboard. This functionality may be used to, for example, enter a text message or other text document.

In other embodiments, manipulandum 124 may enable the user to interact with other virtual objects such as stereo controls, map functions, virtual message objects, or other types of graphical user interfaces.

As shown in FIG. 1, processor 110 is also in communication with one or more control circuits 118. Processor 110 is configured to determine a haptic effect, and transmit a corresponding haptic signal to control circuit 118. The haptic signal comprises a 2-bit signal, wherein one bit comprises a power off/on state, and the other bit comprises an actuation state. In some embodiments, the actuation state may indicate a direction of operation. For example, the actuation state may indicate a direction in which a rotary actuator should apply torque, for example clockwise or counterclockwise. In other embodiments, the actuation state may indicate a direction that an actuator should bend or flex. In still other embodiments, the actuation state may indicate other characteristics of operation of the actuator, for example braking or pulsing.

Control circuit 118 is configured to receive the haptic signal, and based at least in part on the indicated power state and actuation state; transmit a power signal to an actuator 120. In some embodiments, control circuit 118 may comprise an H-bridge. In such an embodiment, control circuit 118 may change the polarity of switches in the H-bridge based at least in part on the haptic signal. In another embodiment, control circuit 118 may comprise a relay. In such an embodiment, control circuit 118 may open or close switches within the relay based at least in part on the haptic signal. In yet another embodiment, control circuit 118 may comprise an analog circuit such as an operational amplifier circuit. In such an embodiment, the haptic signal may be an input to the operational amplifier circuit.

Control circuit 118 is configured to output a power signal configured to cause actuator 120 to operate at a fixed power at the indicated actuation state. In some embodiments, the fixed power comprises substantially the full power of actuator 120. In some embodiments, control circuit 118 outputs the power signal for the same length of time as control circuit 118 receives the haptic signal. In other embodiments, control circuit 118 comprises a timer circuit and thus outputs the power signal for a predetermined length of time. In some embodiments, this length of time may be longer or shorter than the length of time that control circuit 118 receives the haptic signal. In some embodiments, the power signal comprises a DC signal. In such an embodiment, changing the actuation state may comprise changing the polarity of the DC signal. In other embodiments, the power signal is an AC, sinusoidal, signal. In such an embodiment, the bit that controls the actuation state may control the phase of the AC signal. For example, in some embodiments, changing the actuation state bit may change the phase of the AC signal by 180-degrees.

Mobile device 102 further comprises an actuator 120 in communication with control circuit 118. In some embodiments, actuator 120 may be, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA). Actuator 120 is configured to receive a power signal indicating an actuation state and operate at that actuation state. For example, in one embodiment, actuator 120 comprises a rotating motor. In such an embodiment, the power signal may have positive polarity for clockwise direction of applied torque, and negative polarity for counterclockwise direction of applied torque. In another embodiment, actuator 120 may comprise a piezoelectric actuator. In such an embodiment, the actuation state may comprise a direction to bend. For example, in an embodiment wherein actuator 120 comprises a piezoelectric actuator, the actuation state may comprise an indication that the actuator should bend forward or backward.

Actuator 120 is configured such that when in operation, it outputs a haptic effect. In one embodiment, actuator 120 may be configured to output a click. For example, in an embodiment wherein actuator 120 is a rotary actuator configured to output a click, the rotary actuator may rotate for a short duration. This short duration rotation may cause the user to feel a sensation similar to the clicking of a traditional button. In some embodiments, processor 110 may output a haptic signal after processor 110 receives an indication from manipulandum 124 that the user has pressed a button. This haptic signal may serve as a confirmation that the processor received the user input. For example, the haptic effect may comprise a click and the click may alert the user that there is no need to continue pressing the same button. In other embodiments, the haptic effect may comprise a different indication. For example, processor 110 may output a click to indicate that processor 110 expects a user input. In other embodiments, the haptic effect may vary. For example, the haptic effect may comprise vibrations, knocking, hammering, or in some embodiments, the haptic effect may comprise moving the mobile device.

Figure 2:
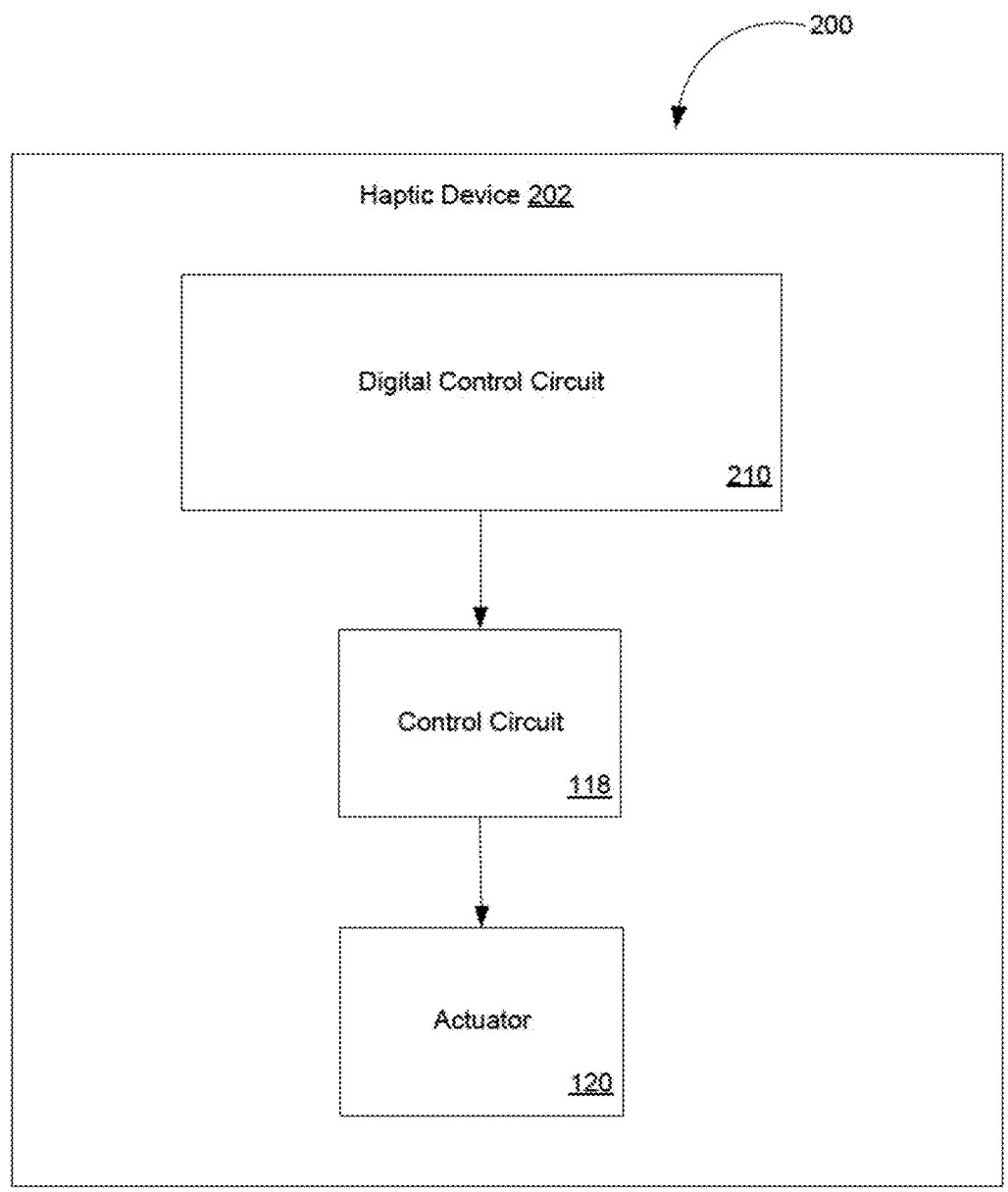
FIG. 2 is another block diagram of a system for minimal haptic implementation according to one embodiment of the present invention.

FIG. 2 is a block diagram of a system for minimal haptic implementation according to one embodiment of the present invention. As shown in FIG. 2, the system 200 comprises haptic device 202. Haptic device 202 comprises a digital control circuit 210, a control circuit 118, and an actuator 120.

In the embodiment shown in FIG. 2, digital control circuit 210 is configured to transmit a 2-bit signal to control circuit 118. In some embodiments, digital control circuit 210 may comprise a processor, an FPGA, a PIC, a PLC, or other control circuit known in the art. For example, in one embodiment, digital control circuit 210 may comprise a switch with a digital output.

The signal transmitted by digital control circuit 210 to control circuit 118 comprises a 2-bit haptic signal. The 2-bit haptic signal comprises a first bit that indicates a power on or power off state and a second bit that indicates an actuation state. Control circuit 118 is configured to receive the haptic signal, and based at least in part on the indicated power state and actuation state, transmit a power signal to an actuator 120. In some embodiments, control circuit 118 may comprise an H-bridge. In such an embodiment, control circuit 118 may change the polarity of switches in the H-bridge based at least in part on the haptic signal. In another embodiment, control circuit 118 may comprise a relay. In such an embodiment, control circuit 118 may open or close switches within the relay based at least in part on the haptic signal. In yet another embodiment, control circuit 118 may comprise an analog circuit such as an operational amplifier circuit. In such an embodiment, the haptic signal may be an input to the operational amplifier circuit.

After receiving the 2-bit haptic signal, control circuit 118 outputs a power signal configured to cause actuator 120 to operate at a fixed power in at the indicated actuation state. In some embodiments, the fixed power comprises substantially the full power of the actuator. In some embodiments, control circuit 118 outputs the power signal for the same length of time as control circuit 118 receives the haptic signal. In other embodiments, control circuit 118 comprises a timer circuit that maintains the power signal for a predetermined length of time. In some embodiments, this length of time may be longer or shorter than the length of time that control circuit 118 receives the haptic signal.

In some embodiments, control circuit 118 is configured to output a haptic effect based on a 1-bit signal. In such an embodiment, control circuit 118 may comprise a signal generation circuit configured to generate a predetermined haptic signal. For example, in one embodiment the signal generating circuit may comprise a transistor circuit comprising resistors and capacitors with values tuned to generate the appropriate output signal. Such an embodiment may be used with solenoid type circuits. Other embodiments of control circuit 118 may comprise operational amplifier circuits comprising resistors and capacitors with values tuned to generate the desired signal. For example, in some embodiments this haptic signal may comprise an AC signal oscillating at a predetermined frequency. In some embodiments, control circuit 118 may be configured to change the frequency of this AC signal over time in order to generate multiple haptic effects. In other embodiments, control circuit 118 may be configured to generate a DC signal. In such an embodiment, control circuit 118 may be configured to change the polarity of the DC signal after a fixed length of time.

Mobile device 102 further comprises an actuator 120 in communication with control circuit 118. In some embodiments actuator 120 may be, for example, a piezoelectric actuator, an electric motor, an electro-magnetic actuator, a voice coil, a linear resonant actuator, an electro-active polymer, a solenoid, an eccentric rotating mass motor (ERM), or a linear resonant actuator (LRA). Actuator 120 is configured to receive a power signal indicating an actuation state and operate at that actuation state. For example, in one embodiment, actuator 120 comprises a rotary motor. In such an embodiment, the power signal may have positive polarity for clockwise direction of applied torque, and negative polarity for counterclockwise direction of applied torque. In another embodiment, actuator 120 may comprise a linear resonant actuator (LRA) or a piezoelectric actuator. In such an embodiment, the power signal may comprise an AC, sinusoidal, signal. In such an embodiment, the bit that controls the actuation state may control the phase of the AC signal. For example, in some embodiments, changing actuation state bit may change the phase of the AC signal by 180-degrees.

Figure 3:
FIG. 3 is an illustration of a system for minimal haptic implementation according to one embodiment of the present invention.

FIG. 3 is an illustration of a system for minimal haptic implementation according to one embodiment of the present invention. The system shown in FIG. 3 comprises mobile device 300. Mobile device 300 comprises a housing 302. The housing 302 comprises a display 116. Display 116 is configured to receive a display signal from processor 110 (not shown), and display an image to the user corresponding to the display signal. In some embodiments, the image may comprise a graphical user interface. For example, the display may comprise a graphical user interface comprising a group of stereo controls. In such an embodiment, the stereo controls may act as virtual controls to a digital music player function of the mobile device.

Mobile device 300 further comprises manipulandum 124. In the embodiment shown, manipulandum 124 comprises buttons and a roller ball. In other embodiments, manipulandum 124 may comprise a scroll wheel, or a touch-screen placed overtop of display 116. In other embodiments, mobile device 300 may comprise a plurality of manipulanda.

Manipulandum 124 is configured to detect user interaction and transmit a signal corresponding to the user interaction to processor 110. In some embodiments, processor 110 may modify the graphical user interface based on signals received from manipulandum 124. Thus, a user may interact with virtual objects on display 116 via manipulandum 124. For example, manipulandum 124 may comprise a touch-sensitive interface, for example a touch-screen. In such an embodiment, display 116 may comprise a virtual keyboard. The user may interact with the keys of the virtual keyboard via the touch-screen. In response, the touch-screen transmits signals corresponding to the user interaction to processor 110. Based on these signals, processor 110 may determine that the user pressed certain keys on the virtual keyboard. This functionality may be used to, for example, enter a text message or other text document. In other embodiments, manipulandum 124 may enable the user to interact with other virtual objects such as stereo controls, map functions, virtual message objects, or other types of graphical user interfaces. Thus, manipulandum 124 gives users the ability to interact directly with the contents of the graphical user interface on display 116.

Illustrative Methods for Minimal Haptic Implementation

Figure 4:
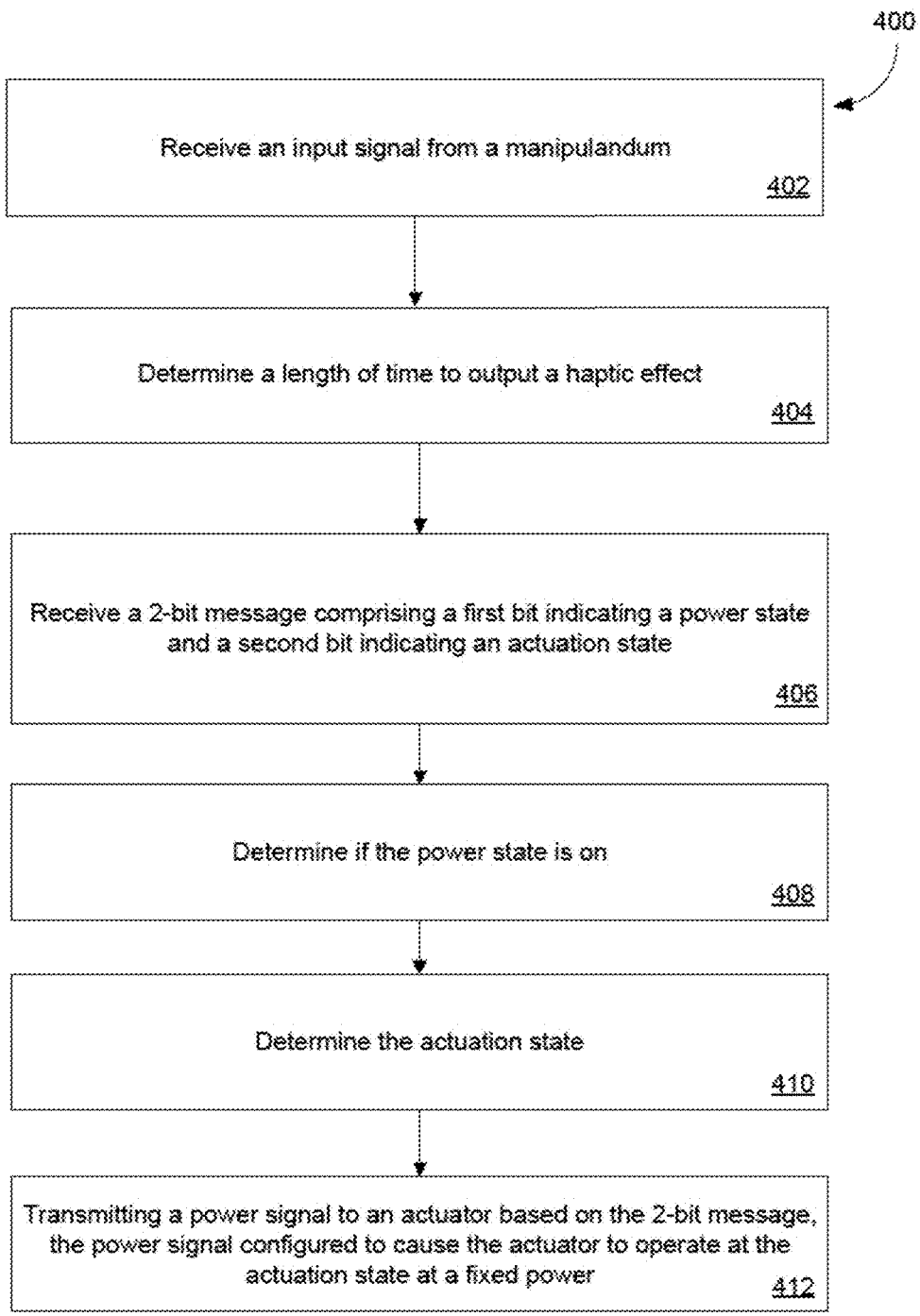
FIG. 4 is a flow chart for a method of generating minimal haptic effects according to one embodiment of the present invention.

FIG. 4 is a flow chart for a method of generating minimal haptic effects according to one embodiment of the present invention. The method 400 begins when processor 110 receives an input signal from manipulandum 124, 402. In some embodiments, manipulandum 124 may comprise a touch-screen. In other embodiments, manipulandum 124 may comprise a button, a roller ball, or a scroll wheel. In still other embodiments, manipulandum 124 may comprise a plurality of manipulanda, for example multiple buttons, a scroll wheel, and a touch-screen. In another embodiment manipulandum 124 may comprise a switch that indicates that an object has been opened or closed.

Next, processor 110 determines a length of time to output a haptic effect. In some embodiments, processor 110 may determine the length of time by performing calculations using algorithms known in the art. In other embodiments, processor 110 may determine the length of time by accessing a lookup table. In such an embodiment, a data store local to processor 110 may comprise the lookup table. In other embodiments, memory 112 may comprise the lookup table. In some embodiments, processor 110 may determine the length of time based on the type of user interaction detected by manipulandum 124. For example, if manipulandum 124 detects repeated user interactions, such as rapid pressure on the touch-screen, processor 110 may determine that the haptic effect should be output for a long length of time. In another embodiment, manipulandum 124 may detect a gentle user interaction, such as a light brush on the touch-screen. In such an embodiment, processor 110 may determine that the haptic effect should last for a short length of time. For example, processor 110 may determine that the haptic effect should comprise a single oscillation of the actuator. In another embodiment, processor 110 may determine multiple oscillations of the actuator.

Then, control circuit 118 receives a 2-bit message comprising a first bit indicating a power state and a second bit indicating an actuation state 406. In some embodiments control circuit 118 may comprise a discrete component such as an H-bridge or a relay. In other embodiments, control circuit 118 may comprise an analog circuit such as an operational amplifier circuit, or a transistor based amplifier circuit.

Next, control circuit 118 determines if the power state is on 408. In some embodiments, determining if the power state is on may comprise opening or closing a set of contacts of a relay. In another embodiment, determining if the power state is on may comprise changing the polarity of the switches of an H-bridge. In still other embodiments, determining if the power state is on may comprise inputting the power state bit into the input of an operational amplifier circuit.

Then, control circuit 118 determines the actuation state 410. In some embodiments, determining the actuation state may comprise opening or closing the contacts of a relay. In another embodiment, determining the actuation state may comprise changing the polarity of the switches of an H-bridge. In still other embodiments, determining if the power state is set to on may comprise inputting the bit comprising the actuation state into an operational amplifier circuit.

Finally, the control circuit 118 transmits a power signal to actuator 120 based on the 2-bit message, the power signal configured to cause actuator 120 to operate in the indicated actuation state at a fixed power. In some embodiments, the fixed power may comprise substantially full power. In some embodiments, the power signal comprises a DC signal. In such an embodiment, changing the actuation state bit may reverse the polarity of the DC signal. In other embodiments, the power signal is an AC, sinusoidal, signal. In such an embodiment, the bit that controls the actuation state may control the phase of the AC signal. For example, in some embodiments, changing the direction bit may change the phase of the AC signal by 180-degrees.

In some embodiments, actuator 120 may be, for example, a piezoelectric actuator, an electric motor, an electro-magnetic actuator, a voice coil, a linear resonant actuator, an electro-active polymer, a solenoid, an eccentric rotating mass motor (ERM), or a linear resonant actuator (LRA). In an embodiment wherein actuator 120 comprises a rotating motor, the actuation state may comprise a direction of rotation, for example clockwise or counterclockwise. In other embodiment, actuator 120 may comprise a piezoelectric actuator. In such an embodiment, the actuation state may comprise a direction to bend. For example, the acatuation state may comprise an indication that the actuator should bend forward or backward.

Figure 5A:
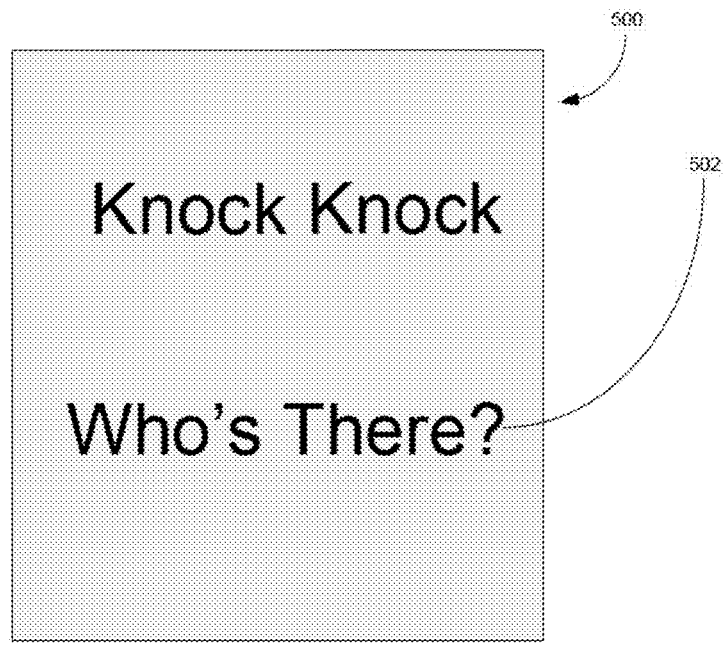
FIG. 5a is an illustration of a system for minimal haptic implementation according to one embodiment of the present invention.

Illustrative Scenarios for Systems and Methods for Minimal Haptic Implementation FIG. 5a is an illustration of a system for minimal haptic implementation according to one embodiment of the present invention. The embodiment shown in FIG. 5a comprises a closed haptic greeting card 500. Haptic greeting card 500 may appear substantially similar to current greeting cards available on the market. In some embodiments, haptic greeting card 500 may comprise text on its face. In the embodiment shown in FIG. 5a, haptic greeting card 500 comprises text 502, which recites "Knock Knock" and "Who's There?" In other embodiments, this text may be different. Other embodiments may further comprise an image to go along with the text. In still other embodiments, haptic greeting card 500 may comprise an image with no text.

Figure 5B:
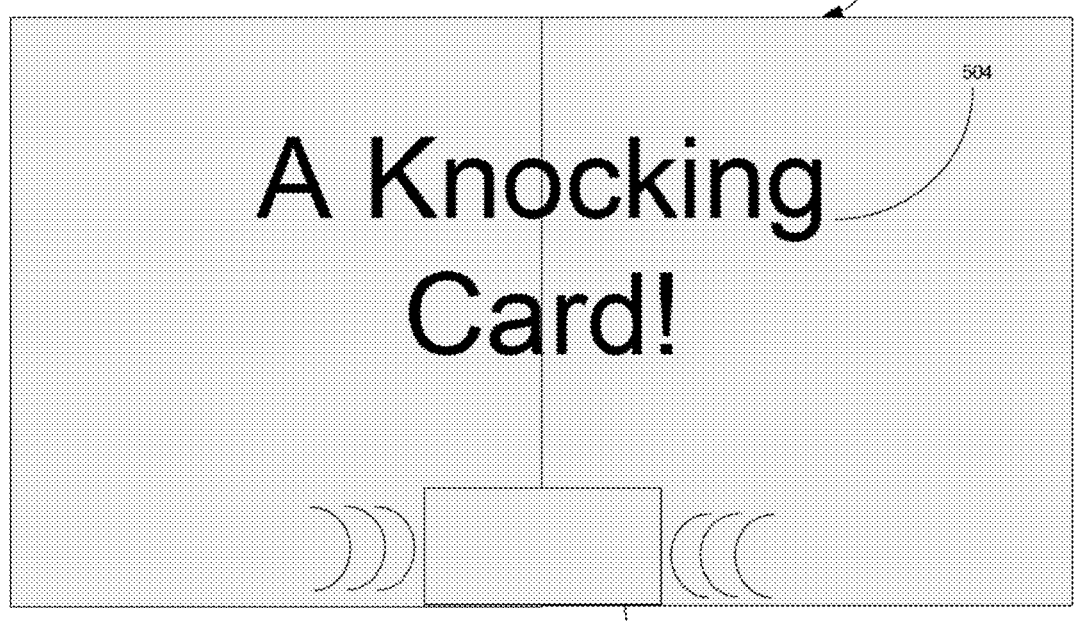
FIG. 5b is another illustration of a system for minimal haptic implementation according to one embodiment of the present invention.

FIG. 5b is an illustration of a system for minimal haptic implementation according to one embodiment of the present invention. The embodiment shown in FIG. 5b comprises an opened haptic greeting card 500. When opened, haptic greeting card 500 may appear substantially similar to current greeting cards available on the market. For example, the haptic greeting card may comprise text. In the embodiment shown in FIG. 5b, haptic greeting card 500 comprises text 504, which recites "A Knocking Card!" In other embodiments, this text may be different. Other embodiments may further comprise an image to go along with the text. In still other embodiments, the haptic greeting card may comprise an image with no text.

Haptic greeting card 500 further comprises an actuator assembly 506. In some embodiments, actuator assembly 506 may not be visible to the user. Actuator assembly 506 comprises a digital control circuit, a control circuit, and an actuator. When the user opens haptic greeting card 506, the digital control circuit sends a digital signal to the control circuit, which outputs a power signal to the actuator. This causes the actuator to output a haptic effect. In some embodiments, the haptic effect comprises a single click. In other embodiments, the haptic effect comprises repeated clicking. In still other embodiments, the haptic effect corresponds to an audio signal played by a speaker within the haptic greeting card. In some embodiments, the haptic effect may vary the when the user opens haptic greeting card 500 further. In some embodiments, the haptic effect may end when the user closes haptic greeting card 500. In still other embodiments, actuator assembly 506 may comprise additional components, enabling more complex effects and operations as discussed throughout this Detailed Description.

Figure 6:
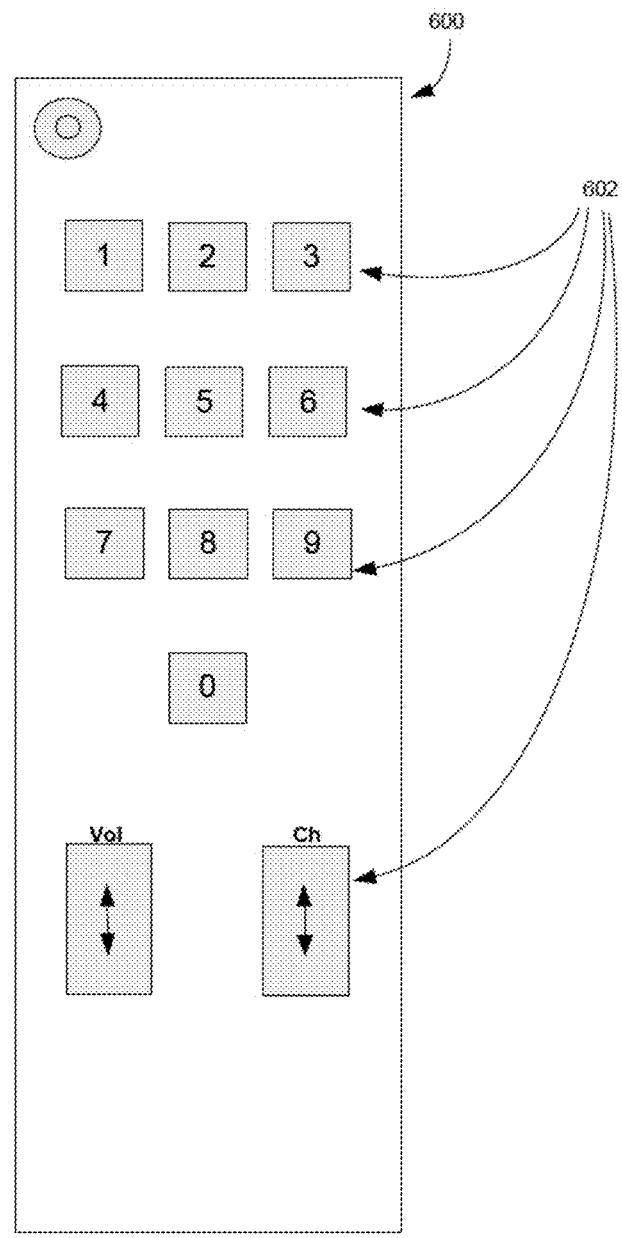
FIG. 6 is another illustration of a system for minimal haptic implementation according to one embodiment of the present invention.

FIG. 6 is an illustration of a system for minimal haptic implementation according to one embodiment of the present invention. FIG. 6 comprises haptic remote control 600. Haptic remote control 600 comprises buttons 602, which control power on/off, channel, and volume for device external to haptic remote control 600. In other embodiments, haptic remote control 600 may comprise additional controls. In still other embodiments, haptic remote control 600 may comprise a touch-screen or a scroll wheel.

Haptic remote control 600 comprises a digital control circuit a control circuit, and an actuator (not shown in FIG. 6). The digital control circuit is configured to transmit a 2-bit signal to the control circuit. The 2-bit signal comprises a first bit indicating a power on or power off state and a second bit indicating an actuation state. The control circuit receives the 2-bit signal and transmits a power signal to the actuator. The power signal is configured to power the actuator at a fixed power in the indicated actuation state. In some embodiments, the fixed power may comprise substantially full power. When in operation, the actuator is configured to output a haptic effect. In some embodiments, this haptic effect may comprise a click. In other embodiments, the haptic effect may comprise multiple clicks, knocking, or any other haptic effect known in the art.

In the embodiment shown in FIG. 6, the digital control circuit is configured to output a 2-bit haptic signal when the user presses one of buttons 602. This causes the control circuit to output a power signal to the actuator, which then outputs a corresponding haptic effect. In some embodiments, the haptic effect may comprise a click. In other embodiments, the haptic effect may comprise a knocking, a vibration, or any other haptic effect known in the art. This haptic effect may serve as an indicator to the user that the haptic remote control 600 has received the user input. Thus, haptic remote control 600 alerts the user that there is no need to press the same button again. For example, haptic remote control 600 may alert the user that repeatedly pressing the channel up button is unnecessary, because the device has already received the user input. In other embodiments, not shown in FIG. 6, minimal haptic implementation may be implemented in a similar way to provide user alerts in almost

Advantages of Systems and Methods for Minimal Haptic Implementation

Embodiments of systems and methods for minimal haptic implementation provide substantial benefits over conventional methods of providing haptic effects. For example, one of the benefits of systems and methods of minimal haptic implementation is that the components are simpler and less expensive. Thus, systems and methods for minimal haptic implementation are less expensive to implement than conventional haptic systems. The reduced costs enables designers to incorporate haptic effects into new systems that may not have been previously considered for haptic feedback. In some embodiments, these systems may even be disposable.

Further advantages of minimal haptic implementation are reduced size and complexity of the control circuitry and actuating mechanism. This enables systems of minimal haptic implementation to be smaller and lighter. Further, systems of minimal haptic implementation may be sold as a discreet component that can be added to devices with a need for haptic feedback.

GENERAL

The foregoing description of the embodiments, including preferred embodiments of the invention, has been presented only for the purpose of illustration and description. It is not intended to be exhaustive or to limit the invention to the precise forms disclosed. Numerous modifications and adaptations thereof will be apparent to those skilled in the art without departing from the spirit and scope of the invention.

That which is claimed is:

1. A control circuit operable to communicate with an actuator, the control circuit configured to:
   receive a first 2-bit haptic signal comprising a first bit indicating a power state of the actuator and a second bit indicating a first actuation state, wherein the power state includes an on state or an off state, and wherein the first actuation state is a first direction of force; and
   transmit a first power signal based on the first 2-bit haptic signal, the first power signal configured to cause the actuator to operate in the first actuation state.

2. The control circuit of claim 1, wherein the actuator is configured to generate a haptic effect.

3. The control circuit of claim 1, wherein the first power signal is configured to cause the actuator to operate at a fixed power and wherein the fixed power is substantially the maximum power of the actuator.

4. The control circuit of claim 1, further comprising a housing configured to contain the control circuit and the actuator, wherein the housing comprises a mobile device housing.

5. The control circuit of claim 1, wherein the second bit comprises a periodic state.

6. The control circuit of claim 1, wherein the control circuit is further configured to determine whether the power state is on.

7. The control circuit of claim 1, wherein the actuator comprises one or more of: a piezoelectric actuator, an electric motor, an electro-magnetic actuator, a voice coil, or a linear resonant actuator.

8. The control circuit of claim 1, wherein the first power signal is an AC signal and the control circuit is further configured to:
   receive a second 2-bit haptic signal; and
   transmit a second power signal based on the second 2-bit haptic signal, wherein the second power signal is an AC signal 180 degrees out of phase with the first power signal.

9. The control circuit of claim 1, wherein the first power signal is a DC signal and the control circuit is further configured to:
   receive a second 2-bit haptic signal; and
   transmit a second power signal based on the second 2-bit haptic signal, wherein the second power signal is a DC signal having a polarity that is reverse of the polarity of the first power signal.

10. The control circuit of claim 1, wherein the control circuit comprises an integrated circuit.

11. The control circuit of claim 10, wherein the integrated circuit comprises an H-bridge.

12. The control circuit of claim 1, wherein the control circuit further comprises a timer circuit that maintains the first power signal for a predetermined length of time.

13. A method comprising:
   receiving a first 2-bit haptic signal comprising a first bit indicating a power state of an actuator and a second bit indicting first actuation state, wherein the power state includes an on state or an off state, and wherein the first actuation state is a first direction of force; and
   transmitting a first power signal based on the first 2-bit haptic signal, the first power signal configured to cause the actuator to operate in the first actuation state.

14. The method of claim 13, wherein the first power signal is an AC signal and further comprising:
   receiving a second 2-bit haptic signal; and
   transmitting a second power signal based on the second 2-bit haptic signal, wherein the second power signal is an AC signal 180 degrees out of phase with the first power signal.

15. The method of claim 13, wherein the first power signal is an DC signal and further comprising:
   receiving a second 2-bit haptic signal; and
   transmitting a second power signal based on the second 2-bit haptic signal, wherein the second power signal is a DC signal having a polarity that is reverse of the polarity of the first power signal.

* * * * *